(12) United States Patent
Fan

(10) Patent No.: US 8,161,126 B2
(45) Date of Patent: Apr. 17, 2012

(54) SYSTEM AND METHOD FOR RDMA QP STATE SPLIT BETWEEN RNIC AND HOST SOFTWARE

(75) Inventor: Kan F. Fan, Diamond Bar, CA (US)

(73) Assignee: Broadcom Corporation, Irvine, CA (US)

(*) Notice: Subject to any disclaimer, the term of this patent is extended or adjusted under 35 U.S.C. 154(b) by 1823 days.

(21) Appl. No.: 11/001,724

(22) Filed: Dec. 2, 2004

(65) Prior Publication Data
US 2005/0135173 A1 Jun. 23, 2005

Related U.S. Application Data

(60) Provisional application No. 60/531,304, filed on Dec. 19, 2003.

(51) Int. Cl.
*G06F 15/167* (2006.01)
*G06F 15/16* (2006.01)

(52) U.S. Cl. ........ 709/212; 709/216; 709/217; 709/218; 709/219

(58) Field of Classification Search .......... 709/212–219; 711/22
See application file for complete search history.

(56) References Cited

U.S. PATENT DOCUMENTS

| 2003/0050990 A1* | 3/2003 | Craddock et al. ............. 709/212 |
| 2004/0049774 A1* | 3/2004 | Boyd et al. ..................... 719/312 |
| 2004/0093389 A1* | 5/2004 | Mohamed et al. ............ 709/212 |

* cited by examiner

*Primary Examiner* — David Lazaro
*Assistant Examiner* — Edward Kim
(74) *Attorney, Agent, or Firm* — Thomas, Kayden, Hostemeyer & Risley, LLP

(57) ABSTRACT

Systems and methods for remote direct memory access (RDMA) queue pair (QP) state split between a RDMA aware network interface card (RNIC) and a host software or application are provided. If a QP state associated with a specific QP comprises a RTS state, the QP state may be processed by an RNIC coupled to a host. If the QP state comprises an "idle" state, a "terminate" state, an "error" state, and/or a "closing" state, the QP state may be offloaded to the host for processing. If the QP state comprises a RTS state, ownership of the QP may be transferred from the host to the RNIC. If the QP state comprises an "idle" state, a "terminate" state, an "error" state, and/or a "closing" state, ownership of the QP may be transferred from the RNIC to the host.

34 Claims, 4 Drawing Sheets

SYSTEM AND METHOD FOR RDMA QP STATE SPLIT BETWEEN RNIC AND HOST SOFTWARE

CROSS-REFERENCE TO RELATED APPLICATIONS/INCORPORATION BY REFERENCE

This application makes reference to, claims priority to, and claims the benefit of U.S. Provisional Application Ser. No. 60/531,304, filed Dec. 19, 2003 and entitled "RDMA QP State Split Between RNIC and Host Software."

The above stated application is incorporated herein by reference in its entirety.

FIELD OF THE INVENTION

Certain embodiments of the invention relate to the processing of packetized data. More specifically, certain embodiments of the invention relate to a system and method for remote direct memory access (RDMA) queue pair (QP) state split between a RDMA aware network interface card (RNIC) and a host software or application.

BACKGROUND OF THE INVENTION

Remote Direct Memory Access (RDMA) is a protocol which may be run over TCP/IP to provide memory copy and message passing semantics. The RDMA specification may be found at http://www.rdmaconsortium.org. With inherent memory copy semantics, remote direct memory access provides the ability of having dedicated hardware to directly place data into an application buffer without host CPU involvement. Each connection may comprise a queue pair (QP) in RDMA terminology and each QP consists of a send queue (SQ), a receive queue (RQ) and one completion queue (CQ). RDMA aware applications may initiate requests to either the SQ or the RQ, and harvest the results of the requests from within the CQ when the RDMA aware network interface card (RNIC) posts a completion record to CQ. Each entry in the SQ and RQ may be referred to as a work request entry, or WQE, whereas each entry in the CQ may be referred to as a completion queue entry, or CQE. Each of the queue pairs (QPs) may be in one of a plurality of states. RDMA memory copy and message passing semantics may only be carried out in the RTS (Ready To Send) state. The full RDMA state is documented in the RDMA Verb Specification, which is incorporated herein by reference in its entirety.

FIG. 1 is a block diagram of a conventional RDMA QP state machine 100. An RNIC interface (RI) may restrict the QP to be in only one of five states. Referring to FIG. 1, the RDMA QP state machine 100 may process a given QP, which may be in an idle state 101, a RTS state 104, a terminating state 102, an error state 103, and/or a closing state 105.

A QP may be created by a Create QP command 107. At the time of creation, the QP is in the idle state 101. A QP may also transition from another state to the idle state 101 after application of a Modify QP verb. For example, the Modify QP verb 109 may transition the QP state from idle state 101 to idle state 101 in order to allow QP context attributes to be modified while in idle state. The Modify QP verb 111 may transition the QP state from the idle state 101 to the RTS state in order to allow support for low lever protocol (LLP) establishment. The Modify QP verbs 113 and 115 may be utilized if WQEs posted to a QP while in idle state have to be removed from the QP. A Modify QP verb 113 may be utilized to transition the QP state from the idle state 101 to the error state 103 and then back to the idle state 101 via the Modify QP verb 115.

The RTS state 104 may provide normal message processing for all SQ and RQ messages. Several verb commands may be applied to a QP while in the RTS state 104. For example, a Modify QP verb 117 may be utilized to transition a QP from the RTS state 104 to the RTS state 104. Such transition may allow for certain QP parameters to be changed while a QP is in associated with another QP. A Modify verb 119 may be utilized to transition the QP state from the RTS state 104 to the closing state 105 whenever the SQ work requests and RDMA read operations are completed. If the SQ work requests or the RDMA read operations are not completed, or if a terminate message has been received via a QP, the Modify QP verb 121 may be utilized to transition the QP from the RTS state 104 to the terminate state 102. A transition to the terminate state 102 may also allow a consumer to notify a remote peer of an abnormal termination of a connected stream. A Modify verb 123 may be utilized to transition the QP from the RTS state 104 to the error state 103 in order to allow upper layer protocol (ULP) abortive teardown.

The terminate state 102 may be utilized to send final terminate messages and to begin an LLP Close processing if a terminate message is received from a remote peer. The terminate state 102 may also be exited to the error state 103. If the terminate state 102 is exited to the error state 103, the LLP stream may no longer be associated with the QP and the LLP stream may be in either a condition of LLP Closed or LLP Reset, 125.

The error state 103 may provide an indication that a QP has experienced an error and has stopped operation. Upon entry of the error state 103, the LLP stream may not be associated with the QP. While in the error state 103, a Modify QP verb 131 may be utilized to transition the QP from the error state 103 to the error state 103.

The closing state 105 may be utilized to wait for an LLP to complete an LLP Close cycle, if there are no errors. When the closing state 105 is exited to the idle state 101 via the transition 127, the LLP stream may not be associated with the QP. Errors detected by an RI whenever a QP is in the closing state 105 may result in a transition 129 to the error state 103.

A conventional RDMA QP state machine may be implemented in a single RNIC so that the RNIC may process a QP in an idle state, a RTS state, a terminating state, an error state, and/or a closing state. However, RDMA QP state processing on the RNIC may require utilization of significant resources and/or hardware on the RNIC.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for remote direct memory access (RDMA) queue pair (QP) state split between a RDMA aware network interface card (RNIC) and a host software or application. Certain aspects of the invention may describe a method to split the QP state processing into two entities. In this regard, the QP State processing may be split into a Full QP State machine (Full-FSM) and a "ready to send" (RTS) only State machine (RTS-FSM). By splitting into two entities, data intensive tasks associated with RTS-FSM may be implemented by a smaller hardware in the RDMA aware Network Interface Card (RNIC), whereas control oriented processing associated with Full-FSM may be implemented by the host software or application. If a QP state associated with a specific QP comprises a RTS state, the QP state may be processed by an RNIC coupled to a host. If the QP state is an "idle" state, a "terminate" state, an "error" state, and/or a "closing" state, the QP state may be uploaded to the host for processing.

If the QP state comprises a RTS state, ownership of the QP may be transferred from the host to the RNIC. If the QP state comprises an "idle" state, a "terminate" state, an "error" state, and/or a "closing" state, ownership of the QP may be transferred from the RNIC to the host. The RTS state may be associated with an RDMA send operation, an RDMA write operation, an RDMA receive operation, and/or an RDMA read operation. The QP state may be processed by a RTS-FSM. The RTS-FSM may be implemented on a dedicated hardware residing on the RNIC. If the QP state is an "idle" state, a "terminate" state, an "error" state, and/or a "closing" state, the QP state may be processed by a Full-FSM residing on the host. QP ownership may be transferred from the RNIC to the host upon occurrence of an unexpected event. A work queue entry (WQE) associated with the QP may be transferred from the RNIC to the host. A completion entry (CQE) may be generated upon completion of the QP state processing by the host or the RNIC.

Another embodiment of the invention may provide a machine-readable storage, having stored thereon, a computer program having at least one code section executable by a machine, thereby causing the machine to perform the steps as described above for RDMA QP state split between a RNIC and a host software or application.

In yet another embodiment, the present invention may provide a system for remote direct memory access (RDMA) operation. The system may comprise a RNIC and a host. The RNIC may process a QP state associated with a QP, if the QP state comprises a RTS state. The host is coupled to the RNIC and may be adapted to process the QP state, if the QP state comprises an "idle" state, a "terminate" state, an "error" state, and/or a "closing" state. Ownership of the QP may be transferred from the host to the RNIC, if the QP state comprises a RTS state. Ownership of the QP may be transferred from the RNIC to the host, if the QP state comprises an "idle" state, a "terminate" state, an "error" state, and/or a "closing" state.

The RTS state may be associated with an RDMA send operation, an RDMA write operation, an RDMA receive operation, and/or an RDMA read operation. A RTS-FSM may be utilized to process the QP state, if the QP state comprises a RTS state. The RTS-FSM may be implemented on a dedicated hardware residing on the RNIC. The system of claim 21, further comprising a full QP FSM (Full-FSM) that processes the QP state, if the QP state is an "idle" state, a "terminate" state, an "error" state, and/or a "closing" state. The Full-FSM may reside on the host. The Full-FSM may be implemented as a kernel mode driver on the host and the kernel mode driver may be implemented in software that runs on the host. A completion entry (CQE) may be generated upon completion of the QP state processing by the RNIC or the host.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for remote direct memory access (RDMA) queue pair (QP) state split between a RDMA aware network interface card (RNIC) and a host software or application. Certain aspects of the invention may describe a method to split the QP state processing into two entities. In this regard, the QP state processing may be split into a full QP finite state machine (Full-FSM) and a RTS only state machine (RTS-FSM). By splitting into two entities, data intensive tasks associated with RTS-FSM may be implemented by a smaller hardware in the RDMA aware Network Interface Card (RNIC), whereas control oriented processing associated with Full-FSM may be implemented by the host software or application.

Figure 2:
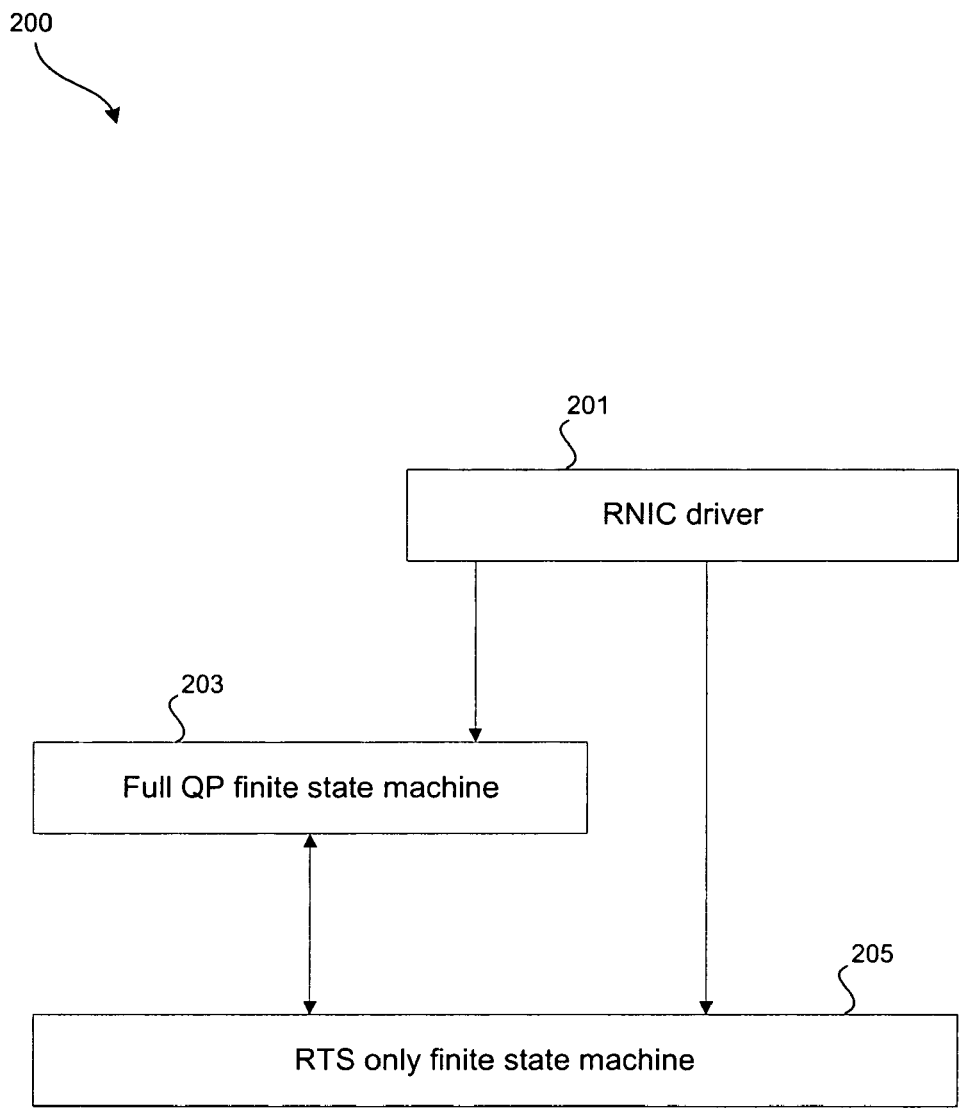
FIG. 2 is a high level block diagram of an exemplary system for RDMA QP state split, in accordance with an embodiment of the present invention.

FIG. 2 is a high level block diagram of an exemplary system for RDMA QP state split, in accordance with an embodiment of the present invention. Referring to FIG. 2, the exemplary system 200 for RDMA QP state split may comprise a RNIC driver 201, a Full-FSM 203 and a RTS-FSM 205.

The RNIC 201 may comprise suitable logic, circuitry and/or code and may provide RDMA capabilities to the applications residing in higher layers. The RTS-FSM 205 may implement a subset of the RDMA verb specification. In particular, the RTS-FSM 205 may implement the functionalities pertaining to the RTS state of a queue pair.

The Full-FSM 203 may implement all the aspects of the QP state machine as defined in the RDMA verb specification. In operation, the RNIC driver 201 may offload a QP to either the Full-FSM 203 or to the RTS-FSM 205. Selection between the Full-FSM 203 or the RTS-FSM 205 may be accomplished on the basis of the QP state of the QP received from the RNIC 201. More specifically, the RTS-FSM 205 may be adapted to process a QP which is in a RTS state, whereas the Full-FSM 203 may be adapted to process a QP which is in any other state. The Full-FSM 203 and the RTS-FSM 205 may also be adapted to communicate with each other as there may be a need to transfer ownership of a QP from the Full-FSM 203 to the RTS-FSM 205, or vice versa.

Figure 3:
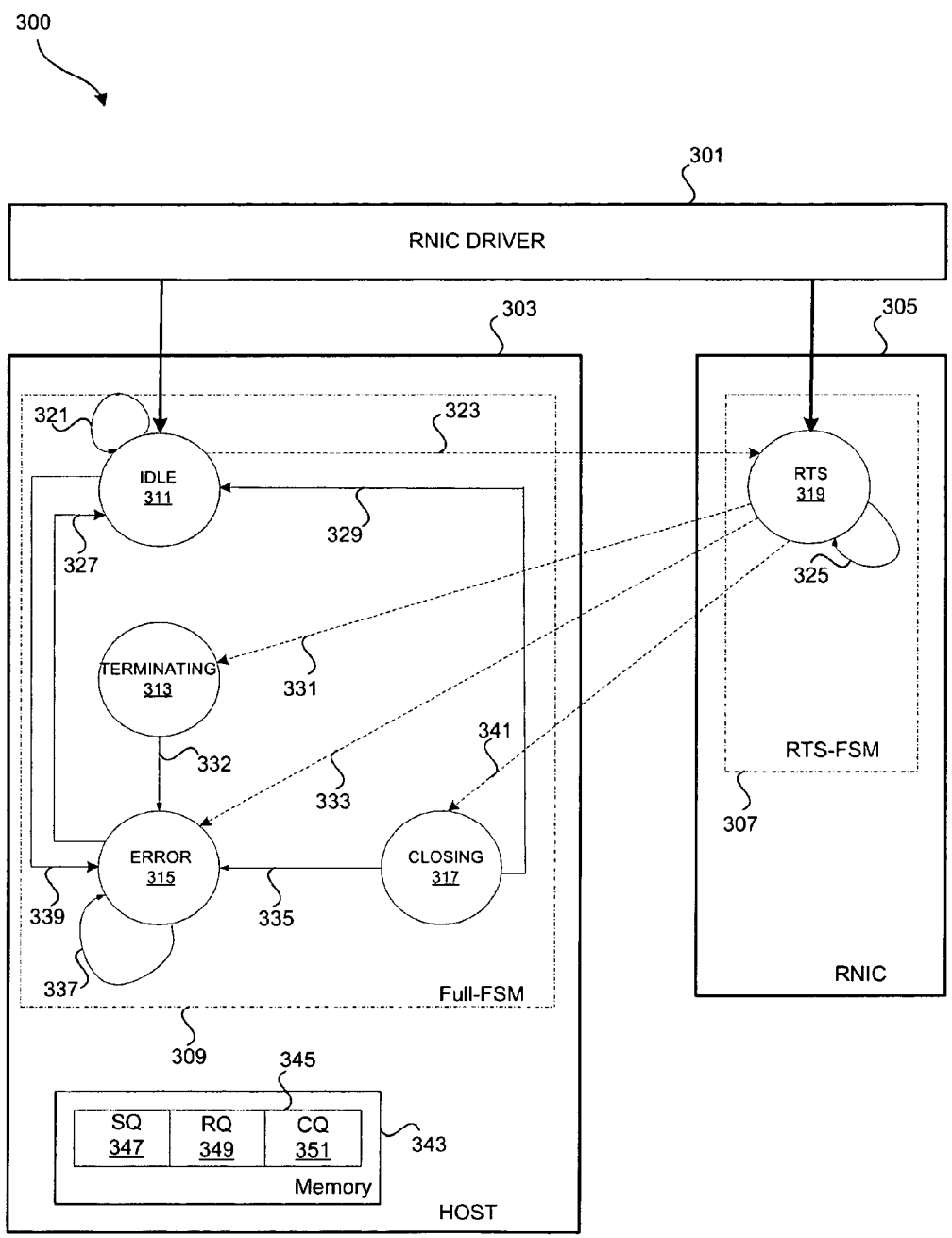
FIG. 3 is a block diagram of an exemplary system for RDMA QP state split between a RNIC and a host software or application, in accordance with an embodiment of the present invention.

FIG. 3 is a block diagram of an exemplary system 300 for RDMA QP state split between a RNIC and a host software or application, in accordance with an embodiment of the present invention. Referring to FIG. 3, the exemplary system 300 may comprise a RNIC 305, a RNIC driver 301, a host 303, a RTS-FSM 307, a Full-FSM 309, and a memory 343 residing on the host 303. The RNIC driver 301 may be adapted to offload queue pairs that are in different states, for example. The queue pairs handled by the RNIC driver 301 may be in an idle state 311, a terminating state 313, an error state 315, a closing state 317, or a RTS state 319. The memory 343 may comprise a QP 345 and the QP 345 may comprise a SQ 347, a RQ 349, and a CQ 351.

Figure 1:
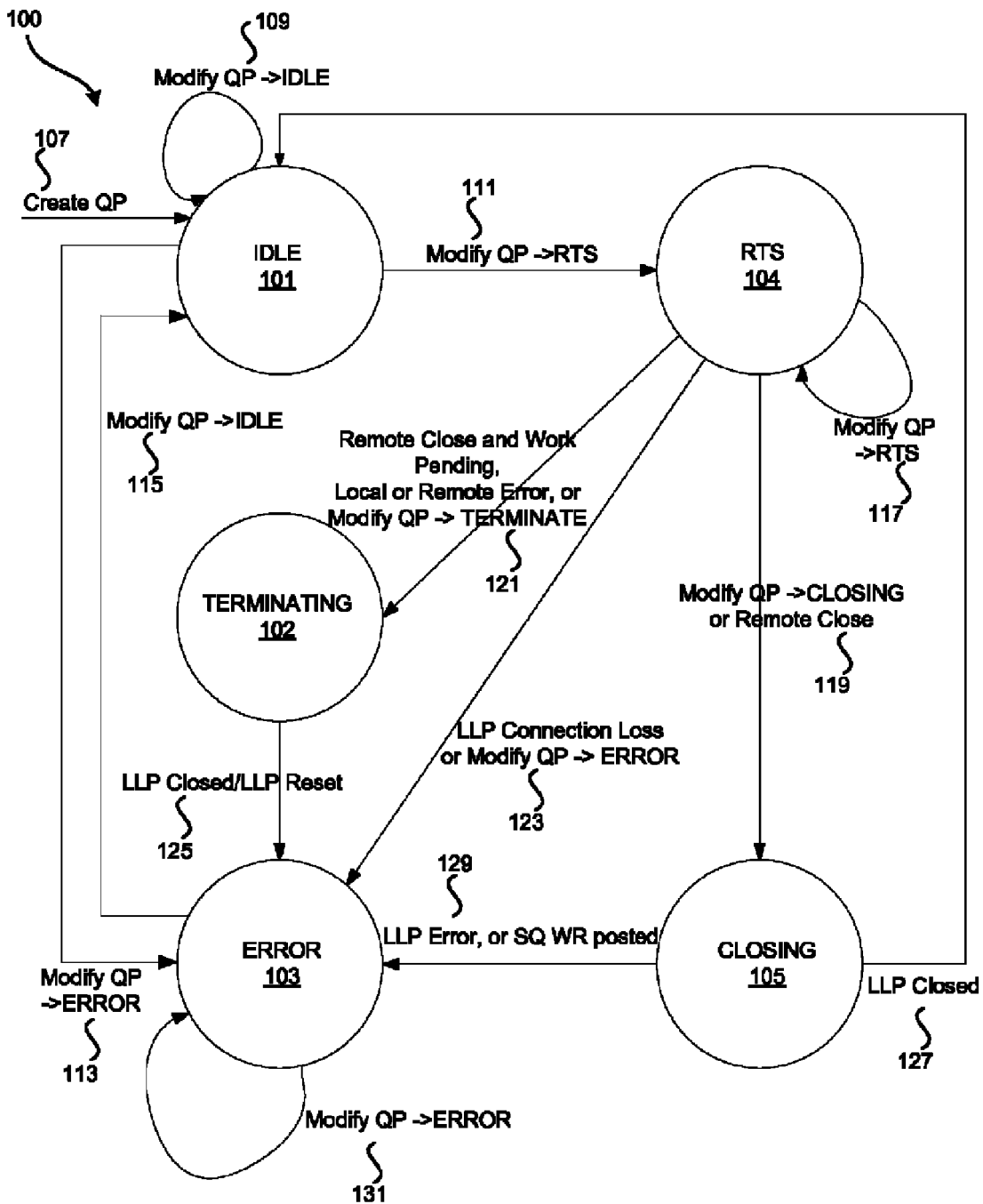
FIG. 1 is a block diagram of a conventional RDMA QP state machine.

In accordance with an embodiment of the invention, the QP state machine of the exemplary system 300 may be managed by distinct finite state machines. For example, the system 300 may comprise a Full-FSM 309 and a RTS-FSM 307. The RTS-FSM 307 may be adapted to process queue pairs that are in an RTS state only, whereas the Full-FSM 309 may be adapted to process queue pairs that may be in any of the remaining four states. The exemplary system 300 may implement a QP state machine that may be somewhat similar to the conventional RDMA QP state machine 100 of FIG. 1. For example, a QP idle state 311 may be transitioned to an idle state 311 via the transition 321. An idle state 311 may also be transitioned to an error state 315 via the transition 339. A RTS state 319 may be transitioned to a RTS state 319 via the transition 325. An error state 315 may be transitioned to an error state 315 or to an idle state 311 via transitions 337 and 327, respectively. A closing state 317 may be transitioned to an error state 335 or to an idle state 311 via transitions 335 and 329, respectively. A terminating state 313 may transition to an error state 315 via the transition 332. The exemplary system 300, however, may utilize functionality that separates QP processing depending on the state of a QP offloaded from the RNIC driver 301. Queue pairs may be offloaded from the RNIC driver 301 to the RTS-FSM 307 or to the Full-FSM 309 depending on the state that they are in.

The RNIC 305 may comprise suitable hardware that implements a RTS-FSM 307 on the RNIC 305, where the RTS-FSM 307 may be adapted to handle QP processing of QPs in the RTS state 319. The RTS state 319 is the state in which full duplex RDMA operations may be performed. A QP may enter an RTS state prior to its offload to the RTS-FSM 307 by the RNIC driver 301, or a QP may transition state from an idle state 311 to a RTS state 319 via the transition 323. The transition 323 may be accomplished by offloading a QP (transferring the QP ownership) from the Full-FSM 309 to the RTS-FSM 307. The RTS-FSM 307 may implement the RDMA Send, RDMA Write, RDMA Receive and RDMA Read operations. In operation, during QP processing by the RTS-FSM 307, unexpected events may be encountered. For example, an LLP connection may be terminated locally and/or remotely, an error may be encountered locally and/or remotely, or an IP fragmentation error access may occur. If an unexpected event occurs at the RTS-FSM 307 during QP processing, the ownership of the QP may be transferred back to the Full-FSM 309. During such transfer of ownership, the QP state may also be transitioned from an RTS state 319 to a terminating state 313, an error state 315, and/or a closing state 317, for example. Transition operations 331, 333 and 341 may be utilized, for example, to transition a QP state from an RTS state 319 to a terminating state 313, an error state 315, and a closing state 317, respectively.

During a transfer of ownership of a QP to the Full-FSM 309 (upload), the work queue entries posted to the send queue and the receive queue in the QP, including partially completed queues, may be transferred to the Full-FSM 309. After upload to the Full-FSM 309, packets received on the QP may be forwarded unmodified to the Full-FSM 309. The Full-FSM 309 may be adapted to handle the actual state transition from RTS to other states, such as the terminating state, for example.

There may be instances when the RNIC driver 301 may not "know" of the presence of the Full-FSM 309, and it may continue to post additional work queue entries to SQ and RQ and subsequently notify the RTS-FSM 307. In an embodiment of the present invention, after receiving such queue pairs, the RTS-FSM 307 may reflect these additional work queue entries to the Full-FSM 309 to enable transparent handling of the QP. When any work queue entry is completed by either the Full-FSM 309 or the RTS-FSM 307, corresponding completion queue entries may be posted to the completion queue.

In a different embodiment of the present invention, the RNIC driver 301 may comprise a user-mode driver that directly interfaces with hardware and bypasses the kernel mode driver. The RTS-FSM 307 may be implemented as a dedicated hardware, for example on the RNIC 305. The Full-FSM 309 may be implemented as a kernel mode driver running on, for example, the host 303. The Full-FSM implementation may be in the form of a host application or software, for example. The exemplary system 300 may comprise a separate RTS-FSM entity implemented on the RNIC 305 and a separate Full-FSM entity implemented on the host 303. Such architecture may enable a subset of the RDMA compliant QP state (i.e., the RTS state) to be implemented in hardware, while still conforming QP processing to the full RDMA verb specification. Accordingly, the RNIC 305 may utilize reduced hardware for RDMA processing and yet still be RDMA compliant. Smaller hardware may also be implemented in the RNIC 305 and still be RDMA compliant.

Figure 4:
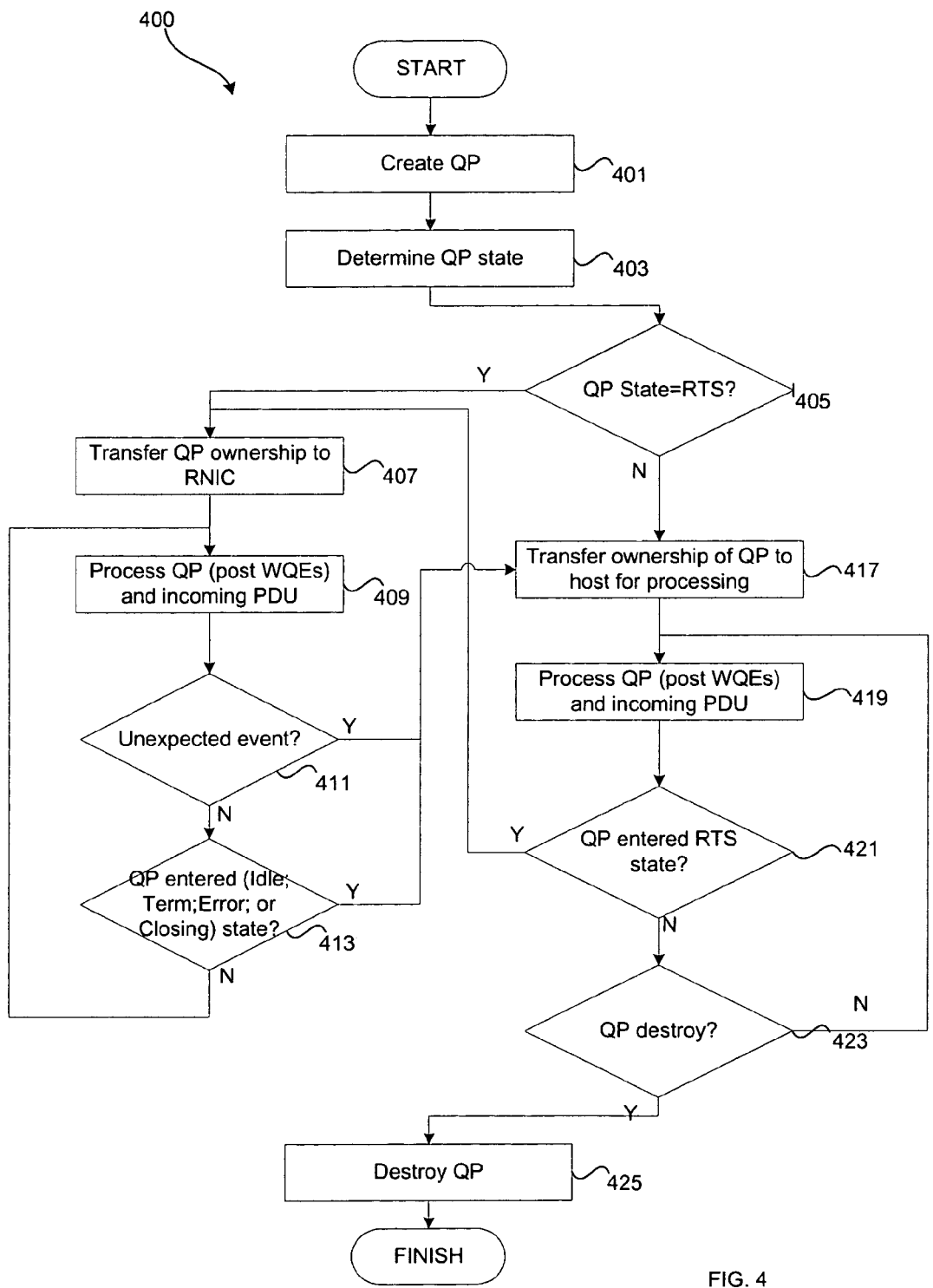
FIG. 4 is a flow diagram of a method for RDMA QP state split between a RNIC and a host software or application, in accordance with an embodiment of the present invention.

FIG. 4 is a flow diagram of a method 400 for RDMA QP state split between a RNIC and a host software or application, in accordance with an embodiment of the present invention. Referring to FIG. 4, at 401, a QP may be created and the QP state may be determined at 403. In one embodiment of the present invention, the receipt of the QP and the QP state determination may be handled by an RNIC driver. After determining the QP state, at 405, it may be determined whether the QP state comprises an RTS state. If the QP state comprises an RTS state, then at 407, ownership of the QP may be transferred to an RNIC, for example. The QP, or post WQE, may then be processed at 409. During processing of a QP in the RTS-FSM, an unexpected event may occur, for example. For example, an LLP connection may be terminated locally and/or remotely, an error may be encountered locally and/or remotely, or an IP fragmentation error access may occur. At 411, it may be determined whether an unexpected event has occurred during QP processing.

In addition, a QP may enter a different state while it is being processed. For example, a QP that was initially in a RTS state, may enter an idle state, a term state, an error state, or a closing state. At 413, it may be determined whether a QP that was initially in a RTS state, has entered an idle state, a term state, an error state, or a closing state. If such transformation has occurred during QP processing, the ownership of the QP may be transferred back to the host for processing, at 417. Similarly, a QP that was initially in an idle state, a term state, an error state, or a closing state may enter a RTS state. At 421, it may be determined whether a QP that was initially in an idle state, a term state, an error state, or a closing state has entered a RTS state. If such transformation has occurred during QP processing, the ownership of the QP may be transferred back to the RNIC for processing, at 407.

The host may run application and/or software, which may implement a Full-FSM. The Full-FSM may be adapted to handle QP processing of QPs in an idle state, a term state, an error state, and/or a closing state. The QPs and incoming PDU may then be processed at 419. Processing of a QP may comprise posting WQEs. At 421, it may be determined whether QP has entered an RTS state. If QP has entered an RTS state, at 407, QP ownership may be transferred to the RNIC. If QP has not entered an RTS state, at 423, it may be determined whether the QP may be destroyed. If the QP may be destroyed, at 425, the QP is destroyed.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for remote direct memory access (RDMA) operation, the method comprising:
   if a queue pair (QP) state associated with a QP comprises a "ready to send" (RTS) state, offloading the QP state to an RDMA aware network interface card (RNIC) coupled to a host, for processing by the RNIC, wherein said offloading is performed by an RNIC driver that is a separate entity from the RNIC; and
   if the QP state comprises one or more of an "idle" state, a "terminate" state, an "error" state, and/or a "closing" state, uploading the QP state to the host for processing, wherein said uploading is performed by said RNIC driver.

2. The method of claim 1, comprising, if the QP state comprises a RTS state, transferring ownership of the QP from the host to the RNIC.

3. The method of claim 1, comprising, if the QP state comprises one or more of an "idle" state, a "terminate" state, an "error" state, and/or a "closing" state, transferring ownership of the QP from the RNIC to the host.

4. The method of claim 1, wherein the RTS state is associated with one or more of an RDMA send operation, an RDMA write operation, an RDMA receive operation, and/or an RDMA read operation.

5. The method of claim 1, comprising processing the QP state by a RTS-only finite state machine (RTS-FSM).

6. The method of claim 5, comprising implementing the RTS-FSM on a dedicated hardware residing on the RNIC.

7. The method of claim 1, comprising, if the QP state comprises one or more of an "idle" state, a "terminate" state, an "error" state, and/or a "closing" state, processing the QP state by a full QP FSM (Full-FSM) residing on the host.

8. The method of claim 1, comprising transferring QP ownership from the RNIC to the host upon occurrence of an unexpected event.

9. The method of claim 8, comprising transferring at least one work queue entry (WQE) associated with the QP from the RNIC to the host.

10. The method of claim 1, comprising generating a completion entry upon completion of the QP state processing by the host or the RNIC.

11. A non-transitory machine-readable medium having stored thereon, a computer program having at least one code section for remote direct memory access (RDMA) operation, the at least one code section being executable by a machine for causing the machine to perform steps comprising:
    if a queue pair (QP) state associated with a QP comprises a "ready to send" (RTS) state, offloading the QP state to an RDMA aware network interface card (RNIC) coupled to a host, for processing by the RNIC, wherein said offloading is performed by an RNIC driver that is a separate entity from the RNIC; and
    if the QP state comprises one or more of an "idle" state, a "terminate" state, an "error" state, and/or a "closing" state, uploading the QP state to the host for processing, wherein said uploading is performed by said RNIC driver.

12. The non-transitory machine-readable medium of claim 11, comprising, code for transferring ownership of the QP from the host to the RNIC, if the QP state comprises a RTS state.

13. The non-transitory machine-readable medium of claim 11, comprising, code for transferring ownership of the QP from the RNIC to the host, if the QP state comprises one or more of an "idle" state, a "terminate" state, an "error" state, and/or a "closing" state.

14. The non-transitory machine-readable medium of claim 11, wherein the RTS state is associated with one or more of an RDMA send operation, an RDMA write operation, an RDMA receive operation, and/or an RDMA read operation.

15. The non-transitory machine-readable medium of claim 11, comprising code for processing the QP state by a RTS-only finite state machine (RTS-FSM).

16. The non-transitory machine-readable medium of claim 15, comprising code for implementing the RTS-FSM on a dedicated hardware residing on the RNIC.

17. The non-transitory machine-readable medium of claim 11, comprising, code for processing the QP state by a full QP FSM (Full-FSM) residing on the host, if the QP state comprises one or more of an "idle" state, a "terminate" state, an "error" state, and/or a "closing" state.

18. The non-transitory machine-readable medium of claim 11, comprising code for transferring QP ownership from the RNIC to the host upon occurrence of an unexpected event.

19. The non-transitory machine-readable medium of claim 18, comprising code for transferring at least one work queue entry (WQE) associated with the QP from the RNIC to the host.

20. The non-transitory machine-readable medium of claim 11, comprising code for generating a completion entry upon completion of the QP state processing by the host or the RNIC.

21. A system for remote direct memory access (RDMA) operation, the system comprising:
    an RNIC driver that offloads a queue pair (QP) state to an RDMA aware network interface card (RNIC) for processing the QP state by the RNIC, if the QP state comprises a "ready to send" (RTS) state, the RNIC driver being a separate entity from the RNIC; and a host coupled to the RNIC that processes the QP state, the QP state being uploaded to the host by the RNIC driver, if the QP state comprises one or more of an "idle" state, a "terminate" state, an "error" state, and/or a "closing" state.

22. The system of claim 21, wherein, ownership of the QP is transferred from the host to the RNIC, if the QP state comprises a RTS state.

23. The system of claim 21, wherein, ownership of the QP is transferred from the RNIC to the host, if the QP state comprises one or more of an "idle" state, a "terminate" state, an "error" state, and/or a "closing" state.

24. The system of claim 21, wherein the RTS state is associated with one or more of an RDMA send operation, an RDMA write operation, an RDMA receive operation, and/or an RDMA read operation.

25. The system of claim 21, comprising, a RTS-only finite state machine (RTS-FSM) that processes the QP state, if the QP state comprises a RTS state.

26. The system of claim 25, wherein the RTS-FSM is implemented on a dedicated hardware residing on the RNIC.

27. The system of claim 21, comprising a full QP FSM (Full-FSM) that processes the QP state, if the QP state comprises one or more of an "idle" state, a "terminate" state, an "error" state, and/or a "closing" state.

28. The system of claim 27, wherein the Full-FSM resides on the host.

29. The system of claim 27, wherein the Full-FSM is implemented as a kernel mode driver on the host.

30. The system of claim 29, wherein the kernel mode driver is implemented in software that runs on the host.

31. The system of claim 21, comprising a completion entry that is generated upon completion of the QP state processing by the RNIC or the host.

32. The method according to claim 1, wherein said uploading is performed without intervention from the RNIC.

33. The non-transitory machine-readable medium according to claim 11, wherein said uploading is performed without intervention from the RNIC.

34. The system according to claim 21, wherein said uploading is performed without intervention from the RNIC.

* * * * *